United States Patent [19]

Repperger

[11] Patent Number: 5,101,472
[45] Date of Patent: Mar. 31, 1992

[54] MILITARY ROBOTIC CONTROLLER WITH MAJORIZING FUNCTION AND NONLINEAR TORQUE CAPABILITY

[76] Inventor: Daniel W. Repperger, 1005 Kenbrook Dr., Vandalia, Ohio 45377

[21] Appl. No.: 593,426

[22] Filed: Oct. 4, 1990

[51] Int. Cl.⁵ ...................... G05B 19/42; G06F 15/46
[52] U.S. Cl. ............................................. 395/96; 901/2
[58] Field of Search ................................ 364/513; 395/96

[56] References Cited

U.S. PATENT DOCUMENTS

| | | | |
|---|---|---|---|
| 4,362,977 | 12/1982 | Evans et al. | 318/568 |
| 4,437,045 | 3/1984 | Mitsuoka | 318/561 |
| 4,737,697 | 4/1988 | Maruo et al. | 318/568 |
| 4,737,905 | 3/1988 | Yoshida et al. | 364/190 |
| 4,763,055 | 8/1988 | Daggett et al. | 364/513 |
| 4,763,276 | 8/1988 | Perreirra et al. | 364/513 |
| 4,772,831 | 9/1988 | Casler, Jr. et al. | 364/513 |
| 4,773,025 | 9/1988 | Penkar et al. | 364/513 |
| 4,791,588 | 12/1988 | Onda et al. | 364/513 |
| 4,985,668 | 1/1991 | Nakazumi et al. | 364/513 |

FOREIGN PATENT DOCUMENTS 1163808  6/1989  Japan ................................. 364/513

*Primary Examiner*—Michael R. Fleming
*Assistant Examiner*—George Davis
*Attorney, Agent, or Firm*—Gerald B. Hollins; Donald J. Singer

[57] ABSTRACT

An error-reducing feedback controller for a robotic system wherein a new torque term is added to the existing generated torque in order to compensate for nonlinearity or imperfect modeling accuracy in the existing system. Equations for development of the new torque term using relatively few inputs from the system output are described, along with several examples, including numeric values.

16 Claims, 7 Drawing Sheets

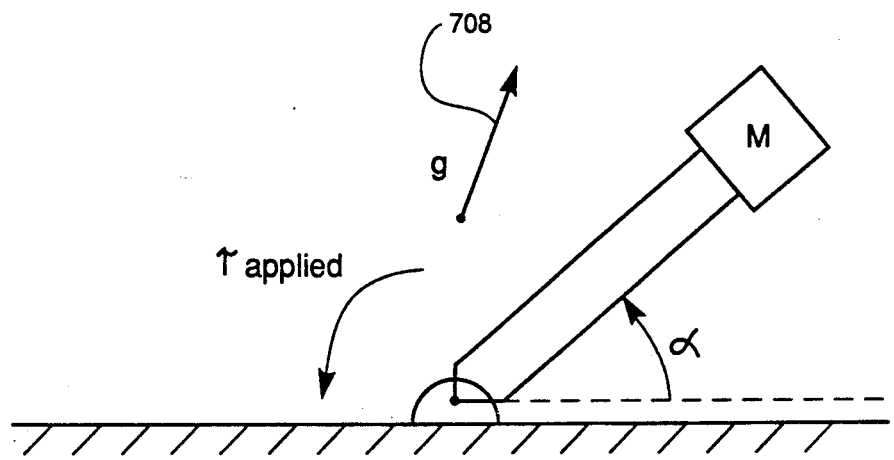
Fig. 7
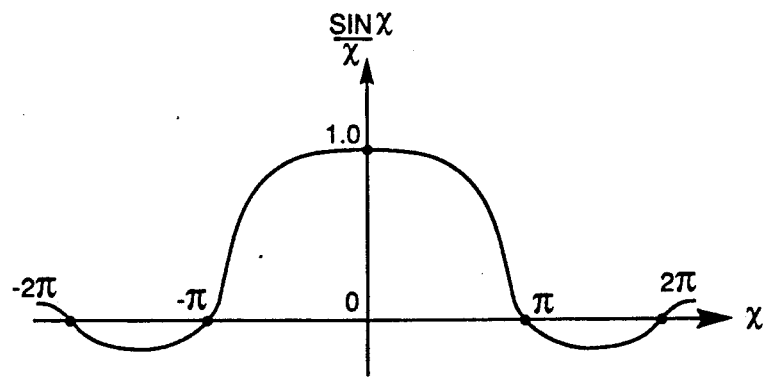
Fig. 8a
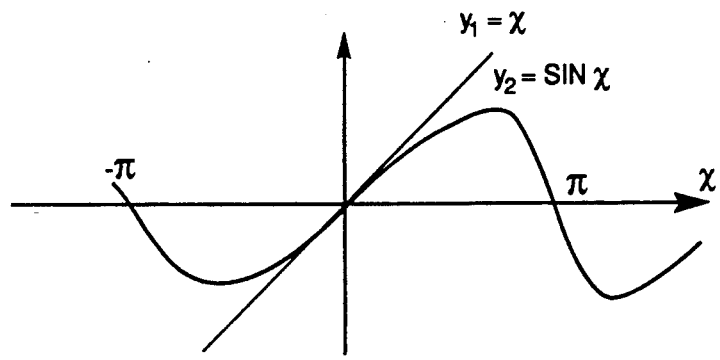
Fig. 8b  $y_1 = \chi$ and $y_2 = \sin \chi$ versus $\chi$

MILITARY ROBOTIC CONTROLLER WITH MAJORIZING FUNCTION AND NONLINEAR TORQUE CAPABILITY

RIGHTS OF THE GOVERNMENT

The invention described herein may be manufactured and used by or for the Government of the United States for all governmental purposes without the payment of any royalty.

BACKGROUND OF THE INVENTION

This invention relates to the field of robotic systems and to the use of such systems in military environments including uses having load variation.

Although robotic systems have achieved a significant degree of acceptance in certain well-controlled environments such as in repetitive manufacturing materials handling and the remote handling of dangerous materials, it is generally accepted in the robotic systems art that such systems perform best when exposed to predictable load demands and linear torque requirements, that is, torque requirements which are not varied according to such real-life effects as Coulomb friction, starting friction, gravity variations, and changes in the mass of the workpiece being transported by the robotic system.

In the military environment where a robotic system would be of major assistance in the loading of ordnance on a military aircraft or in the replacement of aircraft components on a flight line, such repetitive loading and controlled environment conditions are the exception rather than the rule of use. Such military robotic systems are contemplated to especially be susceptible to load variations and to torque linearity difficulties and other mismodeled effects or nonlinearities entering into their equations of motion. In such systems, additional losses due to nonlinear friction, gravity and other effects are found to provide an error between the actual output trajectory of the system, $\alpha(t)$, and the desired output trajectory, $\alpha_d(t)$.

A previous effort to solve problems of this type has resulted in the computed torque method of reducing error in a robotic system. The computed torque method is described in the robotic literature, including the description presented in chapter 8 of the text "Introduction to Robotics, Mechanics and Control", by John J. Craig, Addison Wesley Publishing Co., 1986, the contents of which are hereby incorporated by reference herein. Generally, the computed torque method of error reduction and in a robotic system is found to require exact knowledge of the nonlinearity condition affecting the robot performance and a measurement of the robotic system output, $\alpha(t)$, together with all of its time derivatives. Requirements of this refinement are somewhat difficult to achieve in a practical robotic system, especially the measurement of second derivatives of the system output position, that is, the acceleration of the system output member at any point along its path of travel.

The prior patent art also includes several examples of robotic systems that are concerned with the reduction of output error. Included in these patents is U.S. Pat. No. 4,362,972 of R. C. Evans et al., a system in which the robot's output performance is compared with an independent system of measurement and differences between this independent measurement system and the robot performance are used to improve the robot's performance. These patents also include U.S. Pat. No. 4,437,045 issued to P. Mitsuoka and concerned with the use of a model reference adaptive system in controlling a servomechanism. Also included is the patent of T. Maruo et al., U.S. Pat. No. 4,737,697, which is concerned with the manual teaching of a robotic system during a learning or teaching mode of operation and the imposition of deliberate differences between the learning and playback mode operations of the system.

Also included in these prior patents is the patent of M. Yoshida et al., U.S. Pat. No. 4,737,905, which is concerned with the movement of a driven member such as a machine stage in response to commands received at a joystick controller and including the use of nonlinear transforming circuitry. Additionally included is U.S. Pat. No. 4,763,276 of N. D. Derreirra et al., which is concerned with the refinement of an original command signal in order to improve the robot's output performance. Also included is U.S. Pat. No. 4,791,588 issued to N. Onda et al., which is concerned with the combining of an environmental information input signal with a command signal in order to achieve a high precision position control.

Although these prior art references indicate a considerable degree of attention to the improvement of robotic system performance and reduction of system errors, none is suggestive of the simplified and productive majorizing function addition of a supplemental torque to the normal output of a robotic system as taught in the present invention.

SUMMARY OF THE INVENTION

In the present invention, a stable adaptive robotic control system is achieved by the addition of a new torque $\tau_{new}$ to the existing robotic control system in order to reduce the output position error accomplished by the system. The $\tau_{new}$ torque includes components responsive to the loading mass and output member position of the robotic system, along with an error signal and the error signal's first derivative. The $\tau_{new}$ torque also includes the effects of a majorizing function, assures long-term system stability, and contemplates the selection of stability assuring position and velocity gain constants Kt and Kv.

It is an object of the present invention, therefore, to provide a robotic controller of reduced output error capability.

It is another object of the invention to provide a robotic system suitable for the environmental variations expected in a military robotic application.

It is another object of the invention to provide a robotic system in which the benefits of a majorizing function applied to the system controller prevail.

It is another object of the invention to provide a robotic system in which the addition of a new multiple componented torque achieves a reduced system error.

It is another object of the invention to provide a robotic controller capable of accommodating a plurality of differing friction types.

Additional objects and features of the invention will be understood from the following description and claims, and the accompanying drawings.

These and other objects of the invention are achieved by the method for assuring small errored operating stability in a nonlinear torque environment military robot comprising the steps of:

adding to the torque at each movable joint of said military robot an error reducing torque, $\tau_{new}$, that is defined by the mathematical relationship:

$$\tau_{new} = mgL \cos \alpha d + mL^2 Kpe(t) + mL^2 Kve(t)$$

wherein: m is the mass of the robotic arm and load being controlled, g is the acceleration of gravity, L is the length of the robotic arm being controlled, $\alpha d$ is the angle between the robotic arm and the horizontal plane, Kp is the position gain factor of the robotic arm controller, Kv is the velocity gain factor of the robotic arm controller, and $\dot{e}(t)$ is the first time derivative of e(t);

determining the magnitude of the velocity gain factor Kv of each movable joint controller of said robot in response to a predetermined mathematical criteria for absolute joint movement stability;

selecting the magnitude of the position gain factor $K_p$ of each movable joint controller in response to predetermined mathematical criteria for absolute joint movement stability and the determined magnitude of the velocity gain factor Kv.

BRIEF DESCRIPTION OF THE DRAWINGS

FIG. 7 shows a system of the FIG. 2 type with exposure to an altered gravity force vector.

FIGS. 8a and 8b show graphical representations of two mathematical functions used in the embodiment of a FIG. 3 type robotic system.

DETAILED DESCRIPTION

Figure 1:
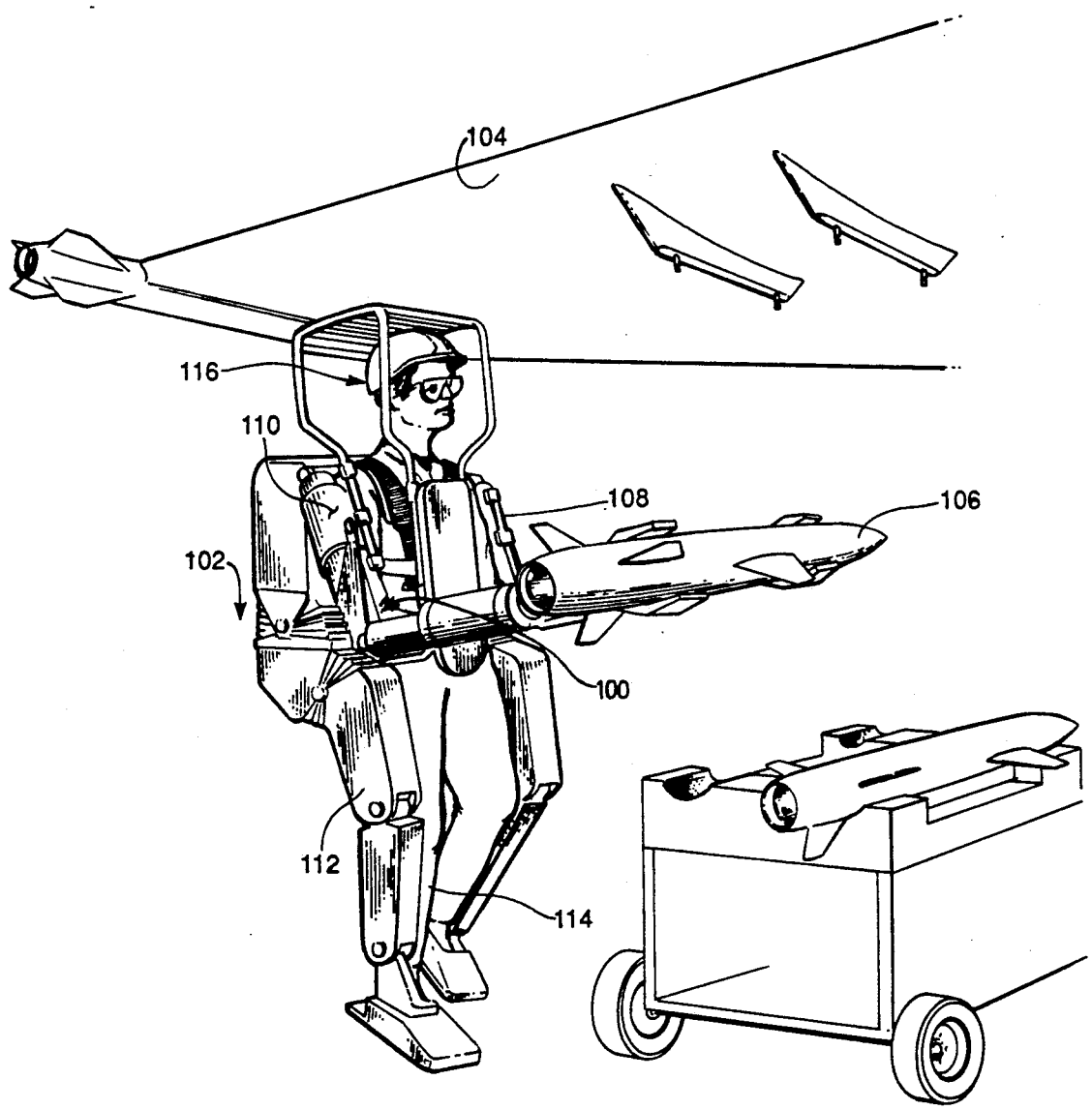
FIG. 1 in the drawings shows a typical military environment robotic system used in an aircraft flight line application.

FIG. 1 in the drawings shows one application of a robotic system to a military environment. In the FIG. 1 system, a human operator 116 is provided with a robotic assistance system 102 which is arranged to be disposed in exoskeleton fashion, paralleling the limbs of the human operator 100, in order that the forces exerted by the human may act as input signals for the robotic system. In the FIG. 1 robotic system therefore, the mechanized arms indicated generally at 108 and 110 are disposed in parallel with the arms of the human operator 100 as also is the robotic leg 112 with respect to the operator's leg 114. In the FIG. 1 drawing, the human operator 116 is being assisted by and is controlling the robotic system in the loading of ordnance 106 onto the wing 104 of an aircraft, as is commonly done in the supporting of military aircraft missions. Systems of the type shown in FIG. 1 have been suggested by the General Electric Company and others for use in situations requiring forces and endurances beyond the capability of a human operator.

Several difficulties have arisen with these systems, however, including their relatively undesirable performance in the presence of varying load masses, fatigue difficulties for the human operator, and instability in the performance of the robotic system. Even the less-complex and more conventional single arm robots used in automobile fabrication and elsewhere are found to also be limited in performance, especially with varying loads and especially with respect to system stability and accuracy. The FIG. 1 robotic system is therefore an example of a robotic system in which there is need for the addition of error correcting and stabilizing signals in the robotic controller which determines the operation of each movable joint in the FIG. 1 system.

Figure 2:
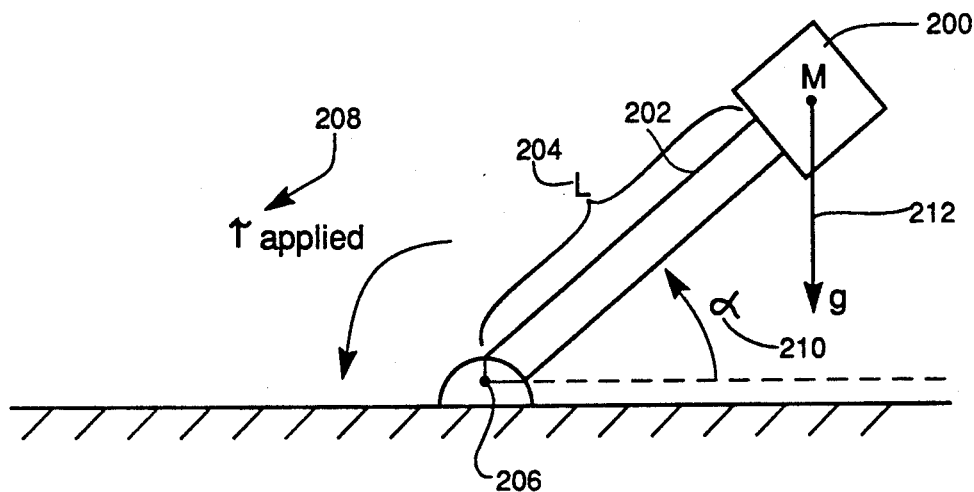
FIG. 2 shows a one-link revolute joint simple robotic system.

FIG. 2 in the drawings shows a simple one-link robot system which is useful in discussing the present invention. The results obtained in the FIG. 2 one-link simplified robotic system can be extended to a multiple link situation of the type shown in FIG. 1 without undue effort. In the FIG. 2 robotic system, a torque $\tau$ as indicated at 208 is applied at the revolute joint 206 in order to accomplish change of the angle of rotation 210 of the link 202 of length L, as indicated at 204, which is supporting a mass 200 that is acted upon by the downwardly directed force of gravity indicated at 212. In the FIG. 2 robotic system, the mass M at 200 is concentrated at the end of the link of length L and the torque 208 is arranged to change the angle of rotation $\alpha$ subject to all of the forces acting on the system, these forces may include the gravity force 212 which acts in opposition of the torque 208.

If there is momentarily no gravity, the equations of motion of the system in FIG. 2 can be written as follows:

$$\tau_{applied} = mL^2 \ddot{\alpha} \qquad (1)$$

where $\ddot{\alpha}$ is the second time derivative ($d^2/dt^2$) of the link 202 position vector $\alpha(t)$. The term $mL^2$ in equation 1 refers to the moment of inertia resulting from the mass M displaced L units from the revolute joint 206. If the objective is to make $\alpha(t)$ follow $\alpha d(t)$ (where $\alpha d$ is the desired trajectory), then the appropriate torque to apply is:

$$\tau_{applied} = mL^2 \ddot{\alpha} d \qquad (2)$$

under the assumption of no gravity vector. Since $\alpha d(t)$ is the known and desired trajectory, then the correct torque to apply is specified via equation (2) under the assumption that gravity does not enter into the equations of motion.

In real applications, however, nonlinear effects influence the operation of the FIG. 2 one link robot. For example, the total torque required for the system when the force of gravity g acts is given by:

$$\tau_{total} = mL^2 \ddot{\alpha} + mgL \cos \alpha \qquad (3)$$

and the nonlinear effect due to gravity makes $\alpha$ actual $<\alpha$ desired. This is easily seen to be true because the gravity torque opposes $\tau$ applied as displayed in FIG. 2. The position error is defined as follows:

$$error = e(t) = \alpha d(t) - \alpha(t) \qquad (4)$$

Therefore, for the nongravity situation a torque as given in equation (2) is applied; consequently, the error in this case is zero. When gravity interacts, however, and the previous value of torque as specified by equation (2) is applied, the following interaction occurs:

$$\tau_{applied} = mL^2 \ddot{\alpha}d = mL^2 + mgL \cos \alpha \qquad (5)$$

In this situation the resulting $\alpha$ would be less than $\alpha d$. To more easily analyze this situation, equation (5) is rewritten as follows:

$$mL^2[\ddot{\alpha}d - \ddot{\alpha}] = mgL \cos \alpha \qquad (6)$$

or $$mL^2[\ddot{e}(t)] = mgL \cos \alpha \qquad (7)$$

Thus (for $\alpha \neq 90$ degrees) there must be an error $e(t) \neq 0$ because the right hand side equation (6) is non-zero and equation (7) is integrated forward in time from $t=0$ resulting in $e(t) \neq 0$.

Figure 3:
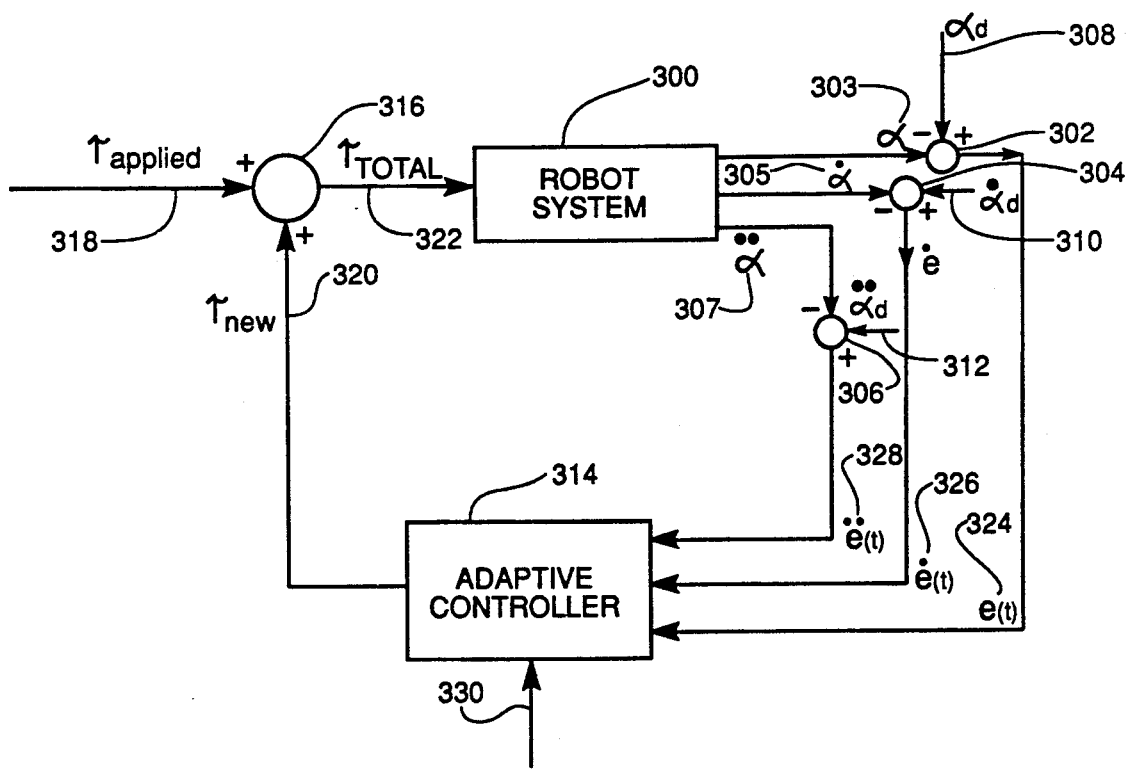
FIG. 3 shows an adaptive robotic controller according to the invention.

One aspect of the invention is to provide an adaptive controller as displayed in FIG. 3. In the FIG. 3 adaptive robotic controller an applied torque signal 318 is combined with a newly generated torque signal $\tau_{new}$, 320 in a summing node 316 to generate a total torque signal 322 that is applied to the robot system 300. The angular position signal 303 and its first and second derivatives 305 and 307 are generated by the robot system 300 for use in generating the new torque signal 320. These robot system generated signals are compared in the summing nodes 302, 304 and 306 with the desired performance determining signals 308, 310 and 312 to generate the error signal 324 and its first and second derivative 326 and 328 that are applied to the adaptive controller 314 in order to generate the new torque signal 320.

In the FIG. 3 controller in the absence of gravity, the error $e(t)$ 324 is zero resulting in $\tau_{total}$ at $322 = \tau_{applied}$ at 318 and $\tau_{new}$ at $320 = 0$ as shown. From FIG. 3 the relationship between total torque ($\tau_{total}$ at 322), the applied torque ($\tau_{applied}$ at 318), and the new torque ($\tau_{new}$ at 320) is given by:

$$\tau total = \tau_{applied} + \tau_{new} \qquad (8)$$

When gravity is present, the new torque ($\tau_{new}$) is used to compensate for the nonlinear effect due to gravity. When gravity or some other nonlinear effect enters the relationship, $\alpha$ at 303 may not be the same as $\alpha d$ at 308, or possibly $\dot{\alpha}$ at 305 may differ from $\dot{\alpha}d$ at 310, or possibly $\ddot{\alpha}$ at 307 is different from $\ddot{\alpha}d$ at 312. This occurs because of the appearance of an error signal when the torque $\tau$ specified in equation (2) is applied and the $\alpha$ which results is different from the $\alpha d$ which was expected.

In the present invention the adaptive controller as displayed at 314 in FIG. 3 is such that $\tau_{new}$ 320 is created to counteract the nonlinear effects and reduce the error 324 to zero. For the special case of nonlinearity in the form of the FIG. 2 gravity situation, it is desired to have:

$$\tau_{new} = mgL \cos \alpha d \qquad (9)$$

then from FIG. 3 and equation (8):

$$\tau_{total} = \tau_{applied} + \tau_{new} \qquad (10)$$

Thus, $$\tau_{total} = mL^2 \ddot{\alpha}d + mgL \cos \alpha d \qquad (11)$$

and the correct torque is applied such that $\alpha$ now follows $\alpha d$. It is assumed that we know $\alpha d(t)$ to compute $\tau_{applied}$. It is reasonable to assume that $\dot{\alpha}(t)$ can be measured from a potentiometer, optical encoder or magnetic resolver, or a measurement of $\alpha(t)$ obtained from a tachometer or $\ddot{\alpha}$ from an accelerometer. Thus this additional information can be included into the adaptive controller 314 as an "other information" input 330.

The typical approach to solving this problem is to use the "Computed Torque" method in which:
1. The exact nature of the nonlinearity is known (i.e., $\tau_{new} = mgL \cos \alpha$).
2. Exact measurement of $\alpha$ and all its derivatives can be accomplished.

The invention described herein, however, has much weaker assumptions:
(1') It may not be possible to know the exact nature of the nonlinearity (it may not only be gravity alone, but there may be torque losses due to nonlinear friction, backlash, dead zone, or some other nonlinearity).
(2') It may sometimes only be possible to measure $e(t)$ (or some of its derivatives) and direct access to $\alpha(t)$ and all of its derivatives may not be possible.

Going back to the assumptions (1) and (2) the computed torque method assumes that $\tau_{total}$ can be subdivided into two parts:

$$\tau_{total} = [M(\alpha,\dot{\alpha})]\tau_{servo\ loop} + \tau_{model\ based} \qquad (12)$$

The $\tau_{servo\ loop}$ term here is the linear part of the torque equation, and $\tau_{model\ based}$ is the nonlinear part and based on known nonlinearities in the dynamic equations describing the model. The term $M(\alpha,\dot{\alpha})$ is used to describe the inertia in the system. In the robotics literature, the typical expression of the total torque 322 required for the load is given by:

$$\tau_{total} = [M(\alpha,\dot{\alpha})]\ddot{\alpha} + V(\alpha,\dot{\alpha}) + G(\alpha) + F(\alpha,\dot{\alpha}) \qquad (13)$$

where, again, $M(\alpha,\dot{\alpha})$ describes the inertia of the system, $V(\alpha,\dot{\alpha})$ are the centrifugal and coriolis torque terms, $G(\alpha)$ is the gravity vector torque, and $F(\alpha,\dot{\alpha})$ are nonlinear torque friction terms.

To implement equation (13), the expression is made of the form:

$$\tau_{total} = [gamma\ \tau_{servo\ loop} + \tau_{model\ based} \qquad (14)$$

where gamma and $\tau_{model\ based}$ are selected to be $$gamma = M(\alpha,\dot{\alpha}) \qquad (15)$$

and $$\tau_{model\ based} = V(\alpha,\dot{\alpha}) + G(\alpha) + F(\alpha,\dot{\alpha}) \qquad (16)$$

Using equations (13, 14, 16) implies:

$$M(a,\dot{a})\tau_{servo\ loop}=\tau_{total}-\tau_{model\ based}=M\ddot{a} \quad (17)$$

or $$M(a,\dot{a})\ \tau_{servo\ loop}=M\ddot{a}=M\ddot{a}d+M[Kpe(t)]+M[Kv\dot{e}(t)] \quad (18)$$

This now specifies $\tau_{servo\ loop}$ which results in the following error equation:

$$\ddot{e}(t)+Kv\dot{e}a(t)=Kpe(t)=0 \quad (19)$$

By designing Kv and Kp the error can be made to follow desired responses for their transient solution. This is the substance of the computed torque design method and is commonly used because the user needs to only work with the linear equation (19); the nonlinear effects are assumed to have been cancelled out in the model based torque given in equation (16). Note, however, that the "Computed Torque" method requires:

1. Exact knowledge of the nonlinearity (e.g., mgL cos $\theta$ must be known precisely).
2. Exact measurements of $\alpha(t)$, e(t), and all their respective derivatives.

Commonly in practice, however, other nonlinear effects may occur. For example, nonlinear friction or threshold effects give rise to other torque losses. Also, in practice, exact measurement of $\alpha(t)$, e(t), and their derivatives may not be possible.

The method of this invention considers the design of a stable, adapted, feedback controller as subject to less knowledge, of the cause of the nonlinearity than is used in the "computed torque" method and needs only limited information concerning $\alpha(t)$, e(t) and their derivatives, rather than assuming exact measurements. The objective, as in FIG. 3, is to achieve an adaptive control scheme to converge on solutions so that limit e(t)→0 as t→∞. This is defined as the stable condition.

In a first example of the present invention, an adaptive controller is arranged to combat the gravity effect. From this first example, extensions will be made to other nonlinear effects that appear in a robotic system.

With gravity considered, in FIG. 2, the torque given in equation (2) is applied but gravity interacts with the equations of motion and an error e(t) specified in equation (4) results. The error grows in time by the relationship specified by equation (7), i.e.:

$$mL^2[\ddot{e}(t)]=mgL\cos\alpha \quad (20)$$

Therefore the appearance of an error indicates that the equations of motion have not been accurately modeled. Therefore, it is desired to find the torque $\tau_{new}$ in equation (10) such that lim e(t)=0 as t→∞. From FIG. 3 we can choose the value of $\tau_{new}$ as illustrated in FIG. 4 (a subset of FIG. 3) in any manner that is required.

Figure 4:
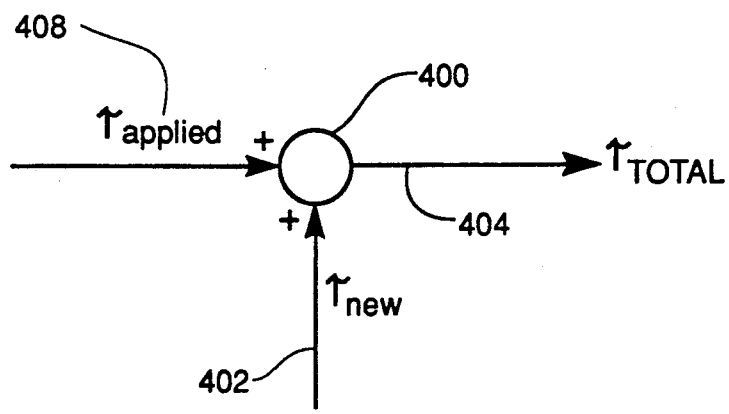
FIG. 4 shows an altered torque summer usable in the FIG. 3 system.
Figure 5:
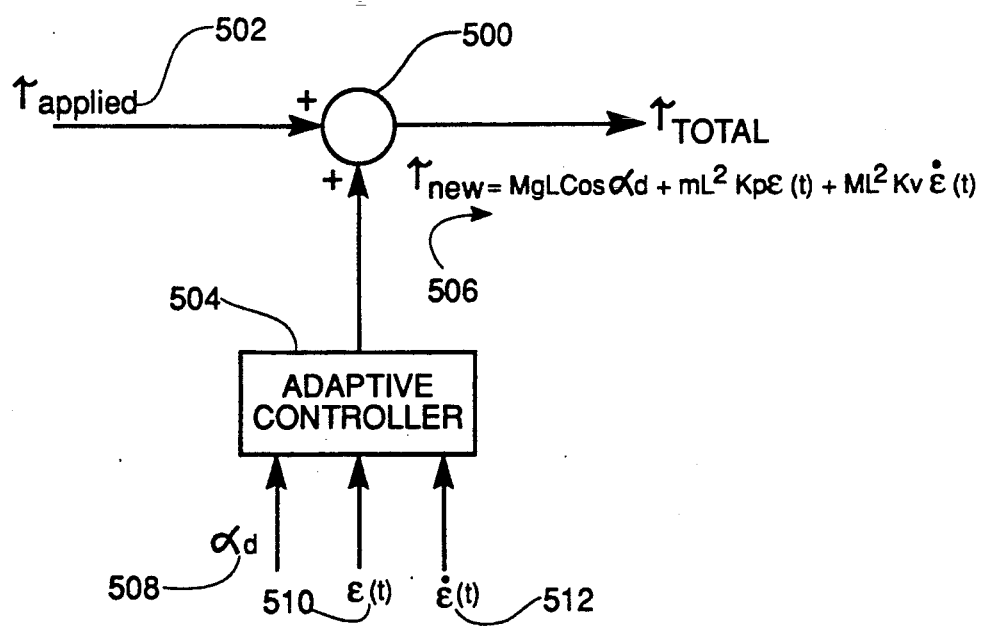
FIG. 5 shows an adaptive controller and inputs therefor that are usable in the present invention.

If $\tau_{applied}=mL^2\ddot{a}d$ in FIG. 4, then e(t) grows via equation (20) if $\tau_{new}=0$. The torque equation can be rewritten as:

$$total\ torque\ required=\tau_{total}=\tau_{applied}+\tau_{new} \quad (21)$$

or $$mL^2\ddot{a}+mgL\cos\alpha=mL^2\ddot{a}d+\tau_{new} \quad (22)$$

if $\tau_{new}$ is zero, as mentioned before, then equation (20) results. Therefore all the components of $\tau_{new}$ are the choice and include whatever is required to stabilize the system. The choice for $\tau_{new}$ (which is the design of the adaptive controller in FIG. 5) is:

$$\tau_{new}=mgL\cos\alpha d+mL^2kp\epsilon(t)+mL^2Kv\dot{\epsilon}(t) \quad (23)$$

where $\epsilon$ is the new error vector when $\tau_{new}\neq 0$. When $\tau_{new}=0$, then $\epsilon$ and e are identical. This is easily implemented as shown in FIG. 5. The three inputs to the adaptive controller must be $\alpha d(t)$, $\epsilon(t)$, and $\dot{\epsilon}(t)$. Knowledge of $\epsilon(t)$ or derivatives of $\alpha d$ are not required for this adaptive controller. When $\tau_{new}$ is non-zero, then:

$$\epsilon(t)=\alpha d(t)-a(t) \quad (24)$$

using the value of $\tau_{new}$ as specified in equation (23). Note that $\epsilon(t)\neq e(t)$ because $\tau_{new}=0$ for the e(t) equation but $\tau_{new}$ is non-zero and specified in equation (23) for the $\epsilon(t)$ equation.

The problem is to now choose the gains Kp and Kv of equation (23) such that $$\lim_{t\to\infty}\epsilon(t)=0 \quad (25)$$

Thus, the system is stabilized.

To design Kp and Kv of equation (23) such that $\epsilon(t)$ satisfies equation (25), equations (21)–(23) are combined as follows:

$$mL^2\ddot{a}+mgL\cos\alpha = mL^2\ddot{a}d + mgL\cos\alpha d + \quad (26)$$
$$mL^2Kp\epsilon(t) + mL^2Kv\dot{\epsilon}(t)$$

This is rewritten as follows:

$$mL^2[\ddot{a}d-\ddot{a}]+mL^2Kp\epsilon(t)+mL^2Kv\dot{\epsilon}(t)=mgL[\cos\alpha-\cos\alpha d] \quad (27)$$

or $$mL^2[\ddot{\epsilon}(t)]+mL^2Kp\dot{\epsilon}(t)+mL^2Kv\epsilon(t)=mgL[\cos\alpha-\cos\alpha d] \quad (28)$$

Use is now made of the trigonometric identity:

$$\cos\alpha-\cos\alpha d=-2\sin(\tfrac{1}{2})[\alpha+\alpha d]\sin[\alpha-\alpha d] \quad (29)$$

or $$\cos\alpha-\cos\alpha d=2\sin(\tfrac{1}{2})[\alpha+\alpha d]\sin[\epsilon(t)] \quad (30)$$

let:

$$f(t)=-2g/L\sin(\tfrac{1}{2})[\alpha+\alpha d] \quad (31)$$

note:

$$|f(t)|\leq 2g/L=G\ \text{for all t} \quad (32)$$

Equation (28) may be rewritten as follows:

$$\ddot{\epsilon}(t)+Kv\dot{\epsilon}(t)+Kp\epsilon(t)+f(t)\sin[\epsilon(t)]=0 \quad (33)$$

The problem is to find values of Kv and Kp such that:

$$\lim_{t \to \infty} \epsilon(t) = 0 \tag{34}$$

In the appendix use is made of Theorem (1): $\sin e < e$ for $e > 0$ which results in equation (33) being written as:

$$\ddot{\epsilon}(t) + Kv\dot{\epsilon}(t) + Kp\epsilon(t) + G\epsilon(t) < 0 \tag{35}$$

or $$\ddot{\epsilon}(t) + Kv\dot{\epsilon}(t) + [Kp + G]\epsilon(t) < 0 \tag{36}$$

where G is constant and defined in equation (32). To now show that the algorithm converges, define v(t) as the solution of the equality (the corresponding equation of the relationship specified in (36)), i.e., $$\ddot{v}(t) + Kv\dot{v}(t) + [Kp + G]v(t) = 0 \tag{37}$$

v(t) can be referred to as a majorizing function as disclosed in reference 2 herein, because from the appendix Theorem (2): if $\epsilon(0) > 0$, $\dot{\epsilon}(0) > 0$. Then:

$$0 < \epsilon(t) < v(t) \tag{38}$$

For the case of nonpositive initial conditions on $\epsilon(t)$, similar results can also be shown using a norm of the quantity $\epsilon(t)$. For this example, as in most robotic problems, the torque requirements are generally under assumed, which makes $\epsilon(t)$ and its initial conditions positive.

If it is shown that $$\lim_{t \to \infty} v(t) \to 0,$$

then it follows that from equation (38) that $$\lim_{t \to \infty} \epsilon(t) = 0$$

and stability is assured. In the appendix (Theorem 3) it is shown that $$\lim_{t \to \infty} v(t) \to 0$$

under the conditions:

$$Kv > 0 \tag{39}$$

$$Kp + G > \text{ or } Kp > -G \tag{40}$$

Thus, the algorithm converges for the proper choices of Kv and Kp specified in Equations (39–40). Note that v(t) is the majorizing function and it bounds the error.

To achieve a second order system step response with the requirement that the characteristic equation is:

$$s^2 + 2zwns + wn^2 = 0 \tag{41}$$

where s is the Laplace transform variable, the z and wn coefficients can be evaluated simply by selecting:

$$wn = (Kp + G)^{\frac{1}{2}} \tag{42}$$

$$z = Kv/2wn = Kv/2(Kp + G)^{\frac{1}{2}} \tag{43}$$

Convergence of this algorithm can be appreciated from a second example invoking nonlinear gravity force. For this example, the robotic system in FIG. 2 is considered when gravity is erroneously neglected and it still enters the equations of motion. Assume the length of the link L is 1 meter, the mass $M = 1$ Kg., and a torque is applied of the form, $\tau_{applied} = mL^2 \ddot{\alpha}d$. $\theta d$ is selected to equal a parabolic function, i.e., $\alpha d(t) = (\frac{1}{2})t^2$. Therefore, $$\tau_{applied} = mL^2 \ddot{\alpha}d = (1)(1)^2 = 1 \text{ kg. meter}^3/\text{sec}^2 \tag{44}$$

The link, however, has a load requirement of:

$$\tau_{total} = mL^2 \ddot{\alpha} + mgL \cos \alpha \tag{45}$$

Thus, the applied torque should be:

$$\tau_{total} = 1 \text{ Kg. meter}^3/\text{sec}^2 + g \cos \alpha d \tag{46}$$

The error equations evolve according to equation (7) via:

$$\ddot{e}(t) = g \cos \alpha(t) \tag{47}$$

assuming $\dot{e}(0) = 0$, $e(0) = 2$, $\alpha(0) = 45°$. If gravity is now considered, $\tau_{applied}$ is still 1 Kg. meter$^3$/sec$^2$, however now;

$$\tau_{new} = g \cos \alpha d + Kp\epsilon(t) + Kv\dot{\epsilon}(t) \tag{48}$$

or more specifically, $$\tau_{new} = [9.2 \text{ m/sec}^2]\cos[t^2/2] + Kp\epsilon(t) + Kv\dot{\epsilon}(t) \tag{49}$$

If Kp and Kv satisfy:

$$Kv = 1.0 \tag{50}$$

$$Kp > -G = -9.2 \tag{51}$$

we choose $Kp = 10$. The new torque law (the adaptive controller) is:

$$\tau_{new} = 1 \text{ kg-m/sec}^2 + 9.2 \text{ m/sec}^2 \cos(t^2/2) + 10\epsilon(t) + \dot{\epsilon}(t) \tag{52}$$

Figure 9:
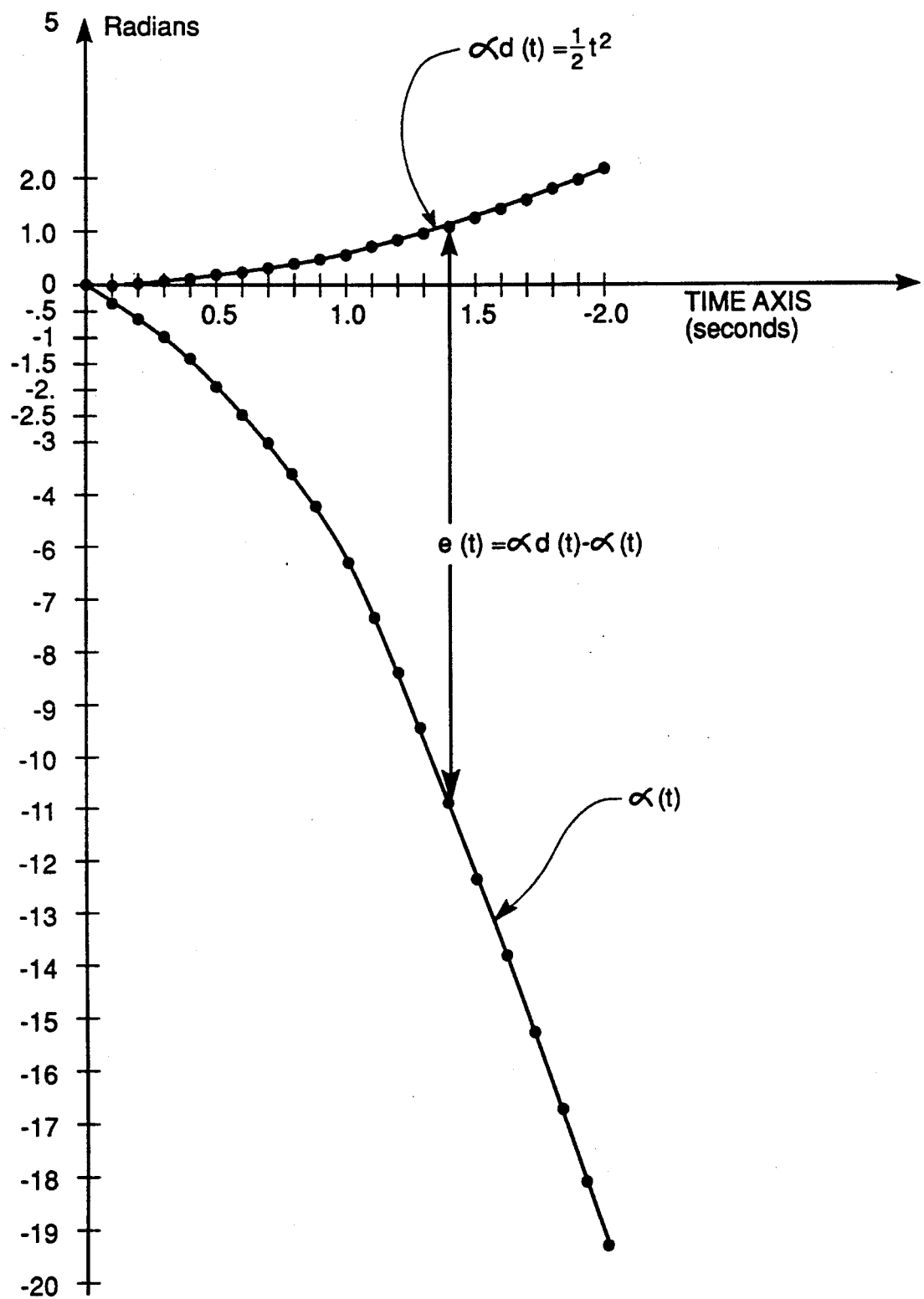
FIG. 9 shows the relationship between error magnitude and time for robotic systems that exclude and include the present invention.
Figure 10:
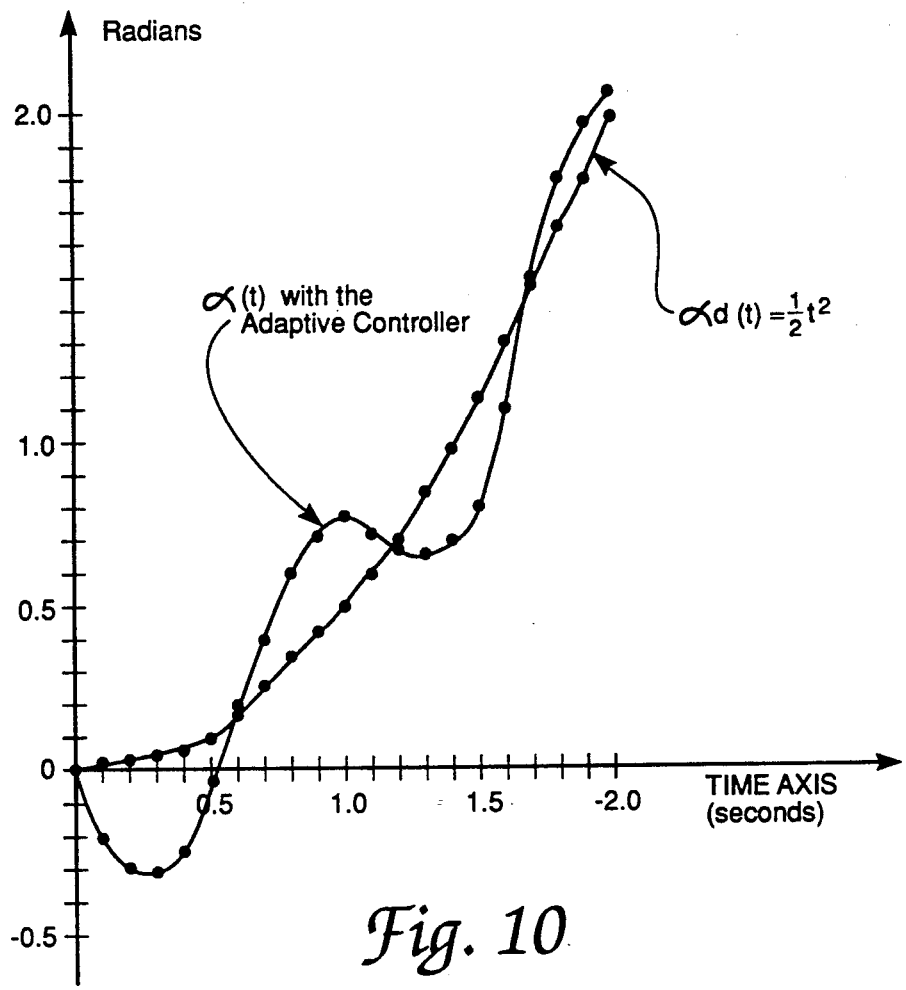
FIG. 10 shows a typical input signal together with the corresponding output of a system according to the present invention.
Figure 11:
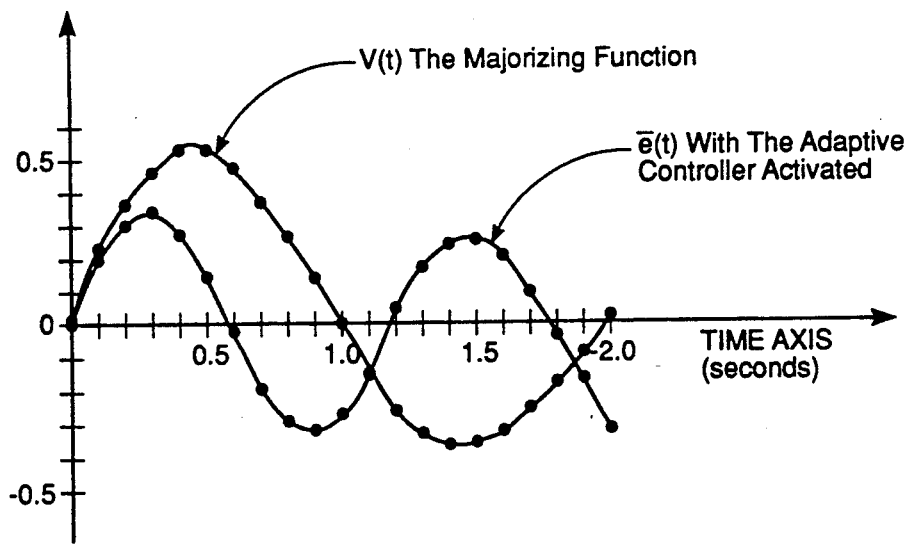
FIG. 11 shows graphically the error signal and majorizing function of the FIG. 10 system.

FIG. 9 illustrates plots of $\alpha d(t)$ and $\alpha(t)$ for the situation where the torque of equation (2) is applied to a system requiring the total torque given in equation (3). The divergence of e(t) is apparent in this figure. FIG. 10 illustrates the situation where the adaptive controller specified in equation (52) is used. The error $\epsilon(t)$ becomes smaller and the output $\alpha(t)$ converges toward $\alpha d$. FIG. 11 illustrates a plot of $\epsilon(t)$ versus time from FIG. 10 and also a plot of v(t), the majorizing function, on the same axis. For v(t):

$$\ddot{v}(t) + Kv\dot{v}(t) + Kpv(t) = 0 \tag{53}$$

or $$\ddot{v}(t) + \dot{v}(t) + 10v(t) = 0 \tag{54}$$

The roots of the characteristic equation are of the form:

$$s^2 + s + 10 = 0 \tag{55}$$

or $$s = -\tfrac{1}{2} + (1-40)^{\tfrac{1}{2}}/2 = -\tfrac{1}{2} + (39)^{\tfrac{1}{2}}i/2 \tag{56}$$

where $i = (-1)^{\tfrac{1}{2}}$, therefore:

$$v(t) = e^{-t/2}[C1 \cos Bt + C2 \sin Bt] \tag{57}$$

where $$B = (39)^{\tfrac{1}{2}}/2 = 3.12 \text{ Radians/second} \tag{58}$$

since $v(0)=0$, $\dot{v}(0)=2$, it follows from equations (57) and these initial conditions:

$$v(t) = (2/B)(\sin Bt)e^{-\tfrac{1}{2}t} \tag{59}$$

since:

$$0 < \epsilon(t) < v(t) \tag{60}$$

and:

$$0 < \dot\epsilon(t) < \dot v(t) \tag{61}$$

From Theorem (2) of the appendix, the performance of this adaptive controller is defined as follows:

$$0 < \dot\epsilon(t) < e^{-\tfrac{1}{2}t}[0.64]\sin[3.12t] \tag{62}$$

$$0 < \epsilon(t) < [.64][e^{-\tfrac{1}{2}t}][-(\tfrac{1}{2})\sin(3.12t) + 3.12\cos(3.12t)] \tag{63}$$

This now defines the performance of this algorithm which depends on both $\alpha d(t)$ and the values selected for Kp and Kv.

In the case of nonlinear torque losses due to friction effects, friction forces cannot be neglected because they are known to account for over 25% of the torque required to move a manipulator. There exist in this instance three kinds of frictional losses that provide losses to the input torque in a robotic manipulator, two of these losses being nonlinear. Linear friction is called viscous friction and is defined as:

$$\tau_1 = B d\alpha/dt \tag{64}$$

Figure 6A:
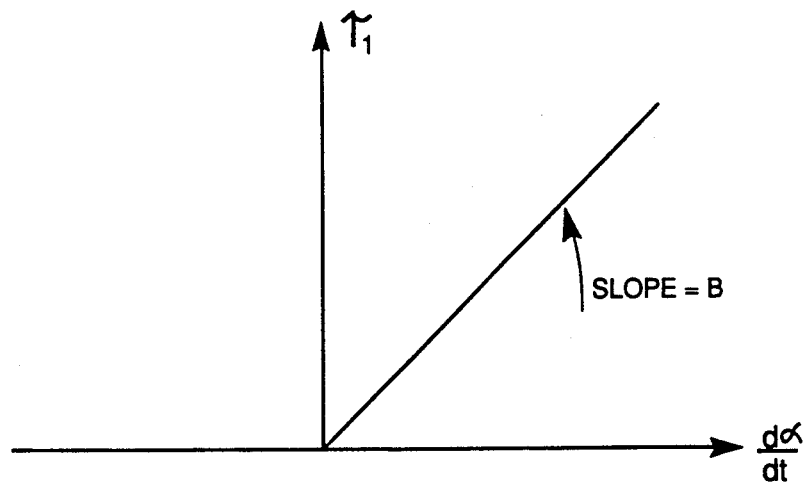
FIGS. 6a, 6b, and 6c show graphical representations of three differing friction types to be accommodated by the FIG. 3 robotic system.

This friction force is proportional to joint velocity. FIG. 6a illustrates a plot of the characteristics of viscous friction.

The second type of friction is called Coulomb friction. It is a constant friction force depending only on the direction of the velocity and it can be characterized by:

$$\tau_2 = Fc \text{ for } \dot\alpha > 0, \tag{65}$$

$$\tau_2 = -Fc \text{ for } \dot\alpha < 0 \tag{66}$$

Figure 6B:
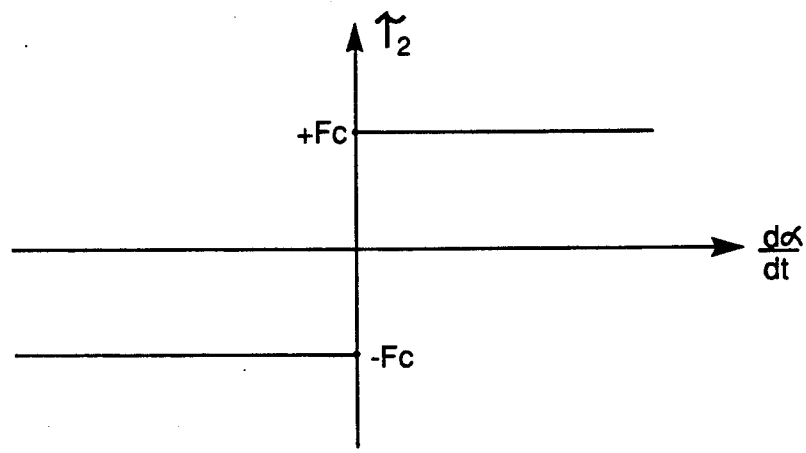

FIG. 6b illustrates a plot of Coulomb friction.

Figure 6C:
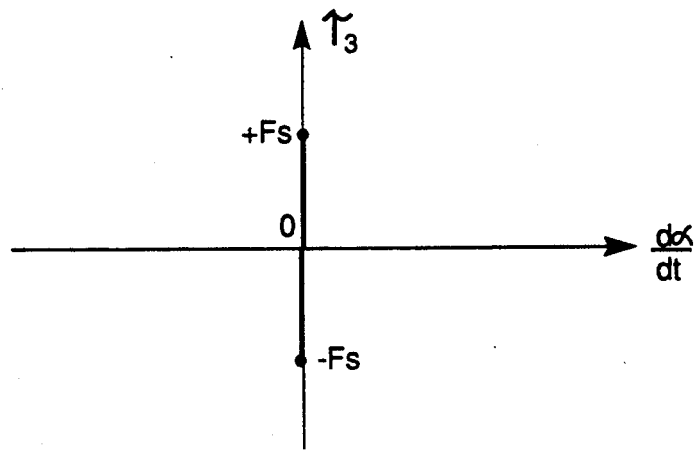

The third type of friction considered here is starting friction or stiction. This friction only occurs when the gears initially move. Such friction is illustrated in FIG. 6c and it can be characterized by:

$$\tau_3 = Fs \text{ if } \dot\alpha > 0 \text{ at } t=0 \tag{67}$$

$$\tau_3 = -Fs \text{ if } \dot\alpha < 0 \text{ at } t=0 \tag{68}$$

Other types of friction exist. They occur if the gears of a mechanism are not perfectly round, for example, so that friction is dependent on $\alpha$. These effects are, however, not considered herein.

Thus the total friction force considered can be represented as:

$$\tau_{friction} = \tau_1 + \tau_2 + \tau_3 \tag{69}$$

or $$\tau_{friction} = B(d\alpha/dt) + Fc[\text{sgn}(\dot\alpha)] + (Fs)\Big|_{\dot\alpha=0} \tag{70}$$

where the term $$(Fs)\Big|_{\dot\alpha=0}$$

only occurs when the joint is in a starting situation and is about ready to move. The expression $\text{sgn}(\dot\alpha)$ is used to indicate the sign of the variable $\dot\alpha$ (plus or minus). FIG. 7 illustrates a robotic system in the situation where the joint moves in such a manner that friction is considered but gravity is not. This would occur if the joint moves through a gravity field perpendicular to the axis of rotation of the joint arm, as is indicated at 708.

In FIG. 7 the direction of gravity is into the paper, and hence does not affect the equations of motion. To characterize an adaptive controller, as in FIG. 4 for this situation, one may start with:

$$\tau_{total} = \tau_{applied} + \tau_{new} \tag{71}$$

and again, as in FIG. 3:

$$\tau_{total} = M(\alpha, \dot\alpha)\tau_{servo\ loop} + \tau_{model\ based} \tag{72}$$

Choosing for the adaptive controller:

$$\tau_{applied} = M(\alpha, \dot\alpha)\ddot\alpha \text{ and} \tag{73}$$

and $$\tau_{new} = mL^2 Kp\epsilon(t) + mL^2 Kv\dot\epsilon(T) + BmL^2 \frac{d\alpha d}{dt} + Fc[\text{sgn}(\dot\alpha d)] + Fs\Big|_{\dot\alpha=0} + mL^2 \ddot\alpha d \tag{74}$$

this results in:

$$\tau_{model\ based} = BmL^2 \frac{d\alpha d}{dt} + Fc[\text{sgn}(\dot\alpha d)] + Fs\Big|_{\dot\alpha=0} \tag{75}$$

and:

$$\tau_{servo\ loop} = L^2\ddot\alpha d + L^2 Kp\epsilon(t) + L^2 Kv\dot\epsilon(t) \tag{76}$$

It is noted in this example, the nonlinear starting friction torque Fs will be modeled as an initial condition for the e(t) equation. In this manner the nonlinearity can be still dealt with using a majorizing function. Using $\epsilon(t) = \alpha d - \alpha(t)$ rewrite equation (71) with the substitutions (72-76) as:

$$mL^2 ([\ddot{\alpha}d - \ddot{\alpha}] + Kp\epsilon(t) + Kv\dot{\epsilon}(t) + B(\dot{\alpha}d - \dot{\alpha})) = \quad (77)$$

$$-Fc[\text{sgn}(\dot{\alpha})] - Fs \Big|_{\dot{\alpha}=0}$$

or $$\qquad (78)$$

$$mL^2 ([\ddot{\epsilon}] + Kp[\epsilon] + [Kv + B][\dot{\epsilon}]) = -Fc\text{sgn}(\dot{\alpha}) - Fs \Big|_{\dot{\alpha}=0}$$

or $$\ddot{\epsilon} + (Kv + B)\dot{\epsilon} + Kp\epsilon < FD \qquad (79)$$

where $$FD = 1/(mL^2)[Fc + Fs] \qquad (80)$$

Again, as before, use is made of a majorizing controller v(t) which, for this case, is of the form:

$$\ddot{v}(t) + [Kv + B]\dot{v} + Kpv = FD \qquad (81)$$

From equation (80) it is obvious that the condition $$\lim_{t \to \infty} v(t) = 0$$

would make the left hand side of equation (80) equal to 0, but the right hand side is non-zero. Therefore in steady state v(t) cannot go to zero. This is a well-known result that in cases where Coulomb friction occurs, there must always be a steady state error. A result of this nature is also noted in the textbook of Kuo identified in the appendix hereof.

To correct this situation, integrated error or feedforward error may be used in the second adaptive controller. Select:

$$\tau \text{ new} = mL^2 Kp\epsilon(t) + mL^2 Kv\dot{\epsilon}(t) + mL^2 B(d\alpha d/dt) + \qquad (82)$$

$$Fc\text{sgn}(\dot{\alpha}d) + Fs \Big|_{\dot{\alpha}=0} + mL^2 Ki \int_0^t \epsilon(a)da + mL^2 \ddot{\alpha}d$$

Again using $$\tau_{total} = \tau_{applied} + \tau_{new} \qquad (83)$$

and equations (72-73, 75-76) now yield:

$$\ddot{\epsilon}(t) + (Kv + b)\dot{\epsilon}(t) + Kp\epsilon(t) + \int_0^t Ki\epsilon(a)da < FD \qquad (84)$$

The variable $\epsilon(t)$ in equation (84) satisfies for $t > 0$:

$$\dddot{\epsilon}(t) + (Kv + B)\ddot{\epsilon}(t) + Kp\dot{\epsilon}(t) + Ki\epsilon < 0 \qquad (85)$$

with majorizing controller v(t) of the form:

$$\dddot{v}(t) + (Kv + B)\ddot{v} + Kp\dot{v}(t) + Kiv(t) = 0 \qquad (86)$$

From Theoreom 4 in the appendix, to insure v(t) has left half plane poles implies:

$$Ki > 0 \qquad (87a)$$

$$Kv > -B \qquad (87b)$$

$$Kp > Ki/(Kv + B) > 0 \qquad (87c)$$

Then $$\qquad (88)$$

$$\lim_{t \to \infty} v(t) \to 0$$

and $0 < e(t) < v(t)$ is stabilized. Thus the Coulomb friction has been corrected by the adaptive control specified by equation (82).

In another example, consider a sudden changes in $M(\alpha, \dot{\alpha})$, the inertia of a robotic manipulator, or changes in torque requirements for friction or requirement for torsional spring constant types of torque are considered. This is the next most common Problem in controlling a robotic manipulator. Typically the manipulator takes on a new load suddenly, or possibly the load is dropped or released. Consequently sudden changes in load are manifested, and as before, upon application of a torque, $\epsilon_{applied}$, the resulting $\alpha$ differs from $\alpha d$. When a sudden change in load occurs, the error e(t) starts growing from zero. For these errors there is need to add an additional torque of the form:

$$\tau_{new} = I_{new} + B_{new}\dot{\alpha} + K_{new}\alpha \qquad (89)$$

Thus the new load may have a new inertia change, $I_{new}$, possibly a new viscous friction term, $B_{new}$, or possibly a new change in spring constant, $K_{new}$. The quantities $I_{new}$, $B_{new}$, or $K_{new}$ could also be negative values. Repeating the procedure used in the previous examples, first start with the torque relationship:

$$\tau_{total} = \tau_{applied} + \tau_{new} \qquad (90)$$

and again requiring:

$$\tau_{total} = M(\alpha, \dot{\alpha})\tau_{servo\ loop} + \tau_{model\ based} \qquad (91)$$

and using a situation similar to FIG. 7 but with M, B, and K changing as indicated in equation (89), from $\tau_{new}$ specified in the same equation, the relationship evolves according to:

$$\tau_{new} = mL^2[I_{new}\,\alpha d + B_{new}\,\alpha d + K_{new}\,\alpha d + Kp\epsilon(t) + \qquad (92)$$

$$Kv\dot{\epsilon}(t) + mL^2\,\alpha d]$$

then the total torque equation becomes:

$$mL^2[\ddot{\alpha} + B_{new}\alpha + K_{new}\alpha] = mL^2[\ddot{\alpha}d + B_{new}\,\alpha d + \qquad (93)$$

$$K_{new}\,\alpha d + Kp\epsilon(t) + Kv\dot{\epsilon}(t)]$$

or:

$$[\ddot{\alpha}d - \ddot{\alpha}] + B_{new}[\alpha d - \alpha] + K_{new}[\alpha d - \alpha] + \qquad (94)$$

-continued $$Kp\epsilon(t) + Kv\dot{\epsilon}(t) = 0$$

or:

$$\ddot{\epsilon}(t) + [B_{new} + Kv]\dot{\epsilon}(t) + [K_{new} + Kp]\epsilon(t) = 0 \quad (95)$$

or:

$$\ddot{\epsilon}(t) + \bar{B}\dot{\epsilon}(t) + \bar{K}\epsilon(t) = 0 \quad (96)$$

Thus $\bar{B}$ and $\bar{K}$ should be so that:

$$\lim_{t \to \infty} \epsilon(t) = 0 \quad (97)$$

This case does not need a majorizing function but can be stabilized similar to equations (36-40) resulting in $\bar{B}>0$ and $\bar{K}>0$ which translates into the conditions $Kv > -B_{new}$ and $Kp > -K_{new}$.

An interesting superposition property occurs due to the linearity of v(t) and the procedure outlined herein. The overall gain values of Kp, Kv, and Ki can be obtained by developing a majorizing function to bound each nonlinearity and then, using the linearity properties of v(t), combine each of these nonlinearity bounds to develop the overall majorizing function.

Thus it is noted that the first type of adaptive controller (for the nonlinearity due to gravity effects) can be combined with the second adaptive controller (to handle nonlinear friction) and also with the third adaptive controller (to handle changing inertial loads). This is true because of the linearity of the v(t) function always dominates the error function no matter what the source of the nonlinearity.

While the apparatus and method herein described constitute a preferred embodiment of the invention, it is to be understood that the invention is not limited to this precise form of apparatus or method and that changes may be made therein without departing from the scope of the invention which is defined in the appended claims.

APPENDIX

Theorem 1: sin x < x for x > 0     (98)

sin x > x for x < 0     (99)

FIG. 8a illustrates a plot of sin x/x and FIG. 8b illustrates plots of y1=x and y2=sin x on the same axes.

$$\text{Lemma (1): } \lim_{x \to 0} \sin x/x = 1 \quad (100)$$

Proof: Using L'Hospital's rule for $$\lim_{x \to 0} f(x)/g(x) = f'(x)/g'(x) \quad (101)$$

We see:

$$\lim_{x \to 0} \sin x/x = \lim_{x \to 0} \cos x/1 = 1/1 = 1 \quad (102)$$

To show sin x < x for x > 0 it is only necessary to show it for $0 > x < \pi$.

Lemma (2): for $0 < x < \pi$, sin x/x < 1     (103)

Proof: let $f(x) = N(x)/D(x)$ where $N(x) = \sin x$ = numerator and $D(x) = x$ = denominator. Note in $$0 < x < \pi, f(x) = \frac{\sin x}{x} = \frac{x - x^3/3! + x^5/5! \ldots}{x} < x/x = 1 \quad (104)$$

To show this is true we need to rewrite N(x) as follows:

$$N(x) = x + x^3/3![-1 + x^2/5 \cdot 4] + x^7/7![-1 + x^2/9 \cdot 8] \quad (105)$$

Thus, since $0 < x < \pi$, $N(x) < x$ because each term, in all the square brackets, is never positive. Therefore, sin x/x < 1.

Lemma (3): For $-\pi < x < 0$, sin x/x < 1     (106)

Proof: let $f(x) = N(x)/D(x) =$     (107)

$$\frac{\sin x}{x} = \frac{x - x^3/3! + x^5/5! \ldots}{x} < x/x = 1$$

Proof: Again rewriting N(x) as above in equation (105), we see for $-\pi < x < 0$, that $N(x) > x$ since $x < 0$ and using the same argument as before. Therefore, sin x/x < 1     (108)

Note: for $|x| > n\pi$, it is easily shown the $|\sin x/x| < 1/(n\pi)$ and the bound gets successively tighter as the integer n increases.

Theorem (2): for the case of $\epsilon(0) > 0$, and $\dot{\epsilon}(0) > 0$ then:

$$\ddot{\epsilon}(t) + Kv\dot{\epsilon}(t) + Kp\epsilon(t) < 0 \quad (109)$$

with majorizing function:

$$\ddot{v}(t) + Kv\dot{v}(t) + Kpv(t) = 0 \quad (110)$$

then:

$$0 < \epsilon(t) < v(t) \quad (111)$$

$$0 < \dot{\epsilon}(t) < \dot{v}(t) \quad (112)$$

if v(t) > 0. Proof: For Equation (101) choose state variables:

$$x1 = v(t), x2 = \dot{v}(t) \quad (113)$$

$$\dot{x}1 = \dot{x}2, \dot{x}2 = -Kv \, x2 - Kp \, x1 \quad (114)$$

$\bar{x}(t)$ be a vector = col[x1, x2], then:

$$\dot{\bar{x}} = A\bar{x}$$

where:

$$A = \begin{bmatrix} 0 & 1 \\ -Kp & -Kv \end{bmatrix} \quad (115)$$

with initial conditions:

$$v(0) = x1(0) > 0 \tag{116}$$

$$\dot{v}(0) = x2(0) > 0 \tag{117}$$

therefore:

$$\bar{x}(t) = e^{At}\bar{x}(0) \tag{118}$$

and $$v(t) = [1,0]\bar{x}(t) = x1(t) \tag{119}$$

for equation (109) let:

$$y1(t) = e(t),\ y2(t) = \dot{e}(t) \tag{120}$$

Then:

$$y1 = y2,\ y2 = e < -Kve - Kpe \tag{121}$$

$$\dot{y}1 = y2,\ \dot{y}2 = \ddot{e} < -Kv\dot{e} - Kpe \tag{121}$$

or $$\dot{y}2 < -Kv\dot{e} - Kpe \tag{122}$$

if $$y \text{ is a vector} = \text{col}[y1, y2] \tag{123}$$

then $$\dot{y} < Ay,\ y(0) = x(0) \tag{124}$$

therefore:

$$y < e^{At}\bar{x}(0) = v(t) \tag{125}$$

because $e^{At}$ is always a positive definite matrix. This implies:

$$y1(t) < x1(t) \text{ which implies } e(t) < v(t) \tag{126a}$$

$$y2(t) < x2(t) \text{ which implies } \dot{e}(t) < \dot{v}(t) \tag{126b}$$

For the cases e(0) and ė(0) not both positive, similar initial conditions can be put on v(t) to maintain the inequality (126a-b).

Theorem (3): if $\ddot{v}(t) + Kv\dot{v}(t)v + \overline{K}pv(t) = 0$ (127)

Find Kv and $\overline{K}p$ such that $$\lim_{t \to \infty} v(t) = 0 \tag{128}$$

Step 1—Laplace transforming equation (127), yields (assuming zero initial conditions):

$$V(s)[S^2 + Kvs + \overline{K}p] = 0 \tag{129}$$

The characteristic equation is:

$$CE = S^2 + Kvs + \overline{K}p = 0 \tag{130}$$

applying the Routh-Hurwitz test:

$$s^2 \quad 1 \quad \overline{K}p \tag{131a}$$

-continued $$s \quad Kv \quad 0 \tag{131b}$$

$$s^0 \quad \overline{K}p \tag{131c}$$

For stability to be assured, select $Kv > 0$, $\overline{Kp} > 0$. Since $\overline{K}p = Kp + G$ in equation (37), this implies:

$$Kp + G > 0 \text{ or } Kp > -G \tag{132}$$

and $$Kv > 0 \tag{133}$$

and this assures that $$\lim_{t \to \infty} v(t) = 0 \tag{134}$$

Note: If equation (128) is Laplace Transformed for initial conditions on v(t) which are non-zero, this adds a polynomial P(s) on the right hand side of equation (129), but the characteristic equation specified by equation (130) is not affected.

Theorem 4: For
$$\dddot{v}(t) + (Kv+B)\ddot{v}(t) + Kp\dot{v}(t) + Kiv(t) = 0 \tag{135}$$

Laplace transforming yields:

$$V(s)[s^3 + (Kv+B)S^2 + Kps + Ki] = P(s) \tag{136}$$

where P(s) is a polynomial of s dependent on the initial conditions v(0). This has a characteristic equation:

$$S^3 + (Kv+B)S^2 + Kps + Ki = 0 \tag{137}$$

Using the Routh-Hurwitz test, implies:

$$s^3 \quad 1 \quad Kp \tag{138a}$$

$$s^2 \quad Kv + B \quad Ki \tag{138b}$$

$$s \quad \frac{Kp(Kv+B) - Ki}{Kv+B} \quad 0 \tag{138c}$$

$$s^0 \quad Ki \tag{138d}$$

For stability it is required that:

$$Ki > 0 \tag{139a}$$

$$Kv > -B \tag{139b}$$

$$Kp(Kv+B) - Ki > 0 \tag{139c}$$

which implies:

$$Kp > Ki/(Kv+B) \tag{140}$$

REFERENCES

Incorporated by reference herein

1. Craig, John J., "Introduction to Robotics, Mechanics and Control", Addison-Wesley Publishing Company, Inc., 1986.
2. Marshall, A. W., I. Olkin, "Inequalities: Theory of Majorization and Its Application", Academic Press, 1979.

3. Bellman, R., "Methods of Nonlinear Analysis", Academic Press, 1970.

4. Kuo, B. C., "Automatic Control Systems", Fourth Edition, Prentice-Hall, 1982.

We claim:

1. The method for assuring small errored operating stability in a movable joint of a nonlinear torque environment military robot comprising the steps of:

adding to the existing torque at said movable joint of said military robot an error reducing torque $\tau_{new}$ that is defined by the mathematical relationship:

$$\tau_{new} = mgL \cos \alpha d + mL^2 kpe(t) + mL^2 Kve(t)$$

wherein: m is the mass of a robotic arm and load being controlled at said joint,
g is the acceleration of gravity,
L is the length of said robotic arm being controlled,
$\alpha d$ is the angle between said robotic arm and horizontal plane,
Kp is the position gain factor at said movable joint,
Kv is the velocity gain factor at said movable joint,
e(t) is the error between attained and desired robotic arm positions, and
e(t) is the first time derivative of e(t);

determining the magnitude of the velocity gain factor, Kv, at said movable joint in response to a predetermined mathematical criteria for absolute joint movement stability;

selecting the magnitude of said position gain factor, Kp, of said movable joint in response to predetermined mathematical criteria for absolute joint movement stability and a determined magnitude of said velocity gain factor Kv;

moving said movable joint between first and second physical positions thereof with a combination of said existing torque and said $\tau_{new}$ torque.

2. The method of claim 1 wherein said predetermined mathematical criteria in said selecting steps is the function:

$$\lim_{t \to \infty} e(t) = 0.$$

3. The method of claim 1 further including the step of limiting the magnitude of said velocity gain factor Kv, and said position gain factor, Kp, to the time dependent amplitude of a predetermined exponential majoring function.

4. The method of claim 3 wherein said majoring functions includes a second derivative with respect to time.

5. The method of claim 1 wherein said nonlinear torque environment includes a resilient spring component, viscous friction, and a changing load impedance;
said predetermined mathematical criteria for the velocity gain factor Kv consists of Kv being larger than the negative of B, the coefficient of viscous friction;
said predetermined mathematical criteria for the position gain factor Kp consists of Kp being larger than the negative of K, the spring component constant.

6. The method of claim 1 wherein said nonlinear torque environment includes the effect of gravity, and:
said velocity gain factor Kv predetermined mathematical criteria consists of Kp being greater than zero; and
said position gain factor Kp predetermined mathematical criteria consists of Kp being greater than the negative of the constant 2g/L where g and L are defined in claim 1.

7. The method of claim 3 wherein said nonlinear torque environment includes a nonlinear gravity effect and:
said majorizing function is defined by the relationship $$v(t) + [Kv]v(t) + Kpv(t) = 0$$

where: v(t) is the majorizing function and v(t) and v(t) its first and second time derivatives, and Kp and Kv are as defined in claim 1.

8. Improved robotic apparatus comprising:
a robotic arm system having a total torque input signal, a force generating movable arm output member, and means for generating output signals representative of attained position, velocity and acceleration of said movable arm output member;
torque signal comparison means connected with an applied torque input signal of said robotic apparatus and an error reducing torque feedback signal for generating said total torque input signal;
a source of movable are output member desired performance determined position, velocity, and acceleration signals;
position error signal generating means connected with said attained position signal and said desired performance determined position signal for generating a position error signal therefrom;
velocity error signal generating means connected with said attained velocity output signal and said desired performance determined velocity signal for generating a velocity error signal therefrom;
acceleration error signal generating means connected with said attained acceleration output signal and said desired performance determined acceleration signal for generating an acceleration error signal therefrom;
adaptive controller means connected with said position error signal, said velocity error signal, and said acceleration error signal for generating said torque feedback signal from a predetermined combination thereof.

9. The robotic apparatus of claim 8 wherein said position error signal is an angular position signal.

10. The robotic apparatus of claim 8 wherein said robotic arm system includes means comprising one of: a potentiometer, an optical encoder and a magnetic resolver, for generating said attained position signal.

11. The robotic apparatus of claim 9 wherein said robotic arm system includes means comprising one of: a differentiation circuit, a tachometer and an accelerometer, for generating said velocity and acceleration signals.

12. The robotic apparatus of claim 8, wherein said adaptive controller means includes an error bounding majorizing function mathematical algorithm.

13. The robotic apparatus of claim 11 wherein said adaptive controller majorizing function mathematical algorithm is selected from a plurality of said algorithms in response to loading predictions for said robotic apparatus.

14. The robotic apparatus of claim 12 wherein said loading predictions are nonlinear in character.

15. The robotic apparatus of claim 13 wherein said majorizing function algorithm includes components each selected in response to a different nonlinear load.

16. The method for assuring small errored operating stability in a nonlinear torque environment military robot comprising the steps of:

adding to the existing torque at a predetermined movable arm joint of said military robot an additional error reducing torque $\tau_{new}$ that is determined by a physical embodiment of a selected one of predetermined mathematical relationships between:

m the mass of said robotic arm and loading thereon,
g the acceleration of gravity,
L the length of said robotic arm,
α the angle between said movable arm and a horizontal plane,
Kp the position gain factor at said movable joint of said controlled arm,
Kv the velocity gain factor at said movable joint of said controlled arm,
e(t) the error between attained and desired robotic arm positions, and
ė(t) the arm velocity first time derivative of e(t);

determining the magnitude of the velocity gain factor, Kv, of a movable joint controller of said robot in response to predetermined mathematical criteria for absolute joint movement stability;

selecting the magnitude of the position gain actor $K_p$ of said movable joint controller in response to predetermined mathematical criteria for absolute joint movement stability and the determined magnitude of said velocity gain factor Kv;

moving said movable arm at said joint with a combination of said existing and $\tau_{new}$ torques.

* * * * *